US005586965A

United States Patent [19]

Knelson

[11] Patent Number: 5,586,965

[45] Date of Patent: Dec. 24, 1996

[54] CENTRIFUGAL SEPARATOR WITH CONICAL BOWL SECTION AND AXIALLY SPACED RECESSES

[76] Inventor: Benjamin V. Knelson, 20321-86th Ave., Langley, British Columbia, Canada, V3A 6Y3

[21] Appl. No.: 439,273

[22] Filed: May 11, 1995

[51] Int. Cl.[6] .................... B04B 11/00; B01D 43/00

[52] U.S. Cl. .................... 494/29; 494/37; 494/56; 494/80

[58] Field of Search .................... 494/37, 27–29, 494/43, 56, 67, 80

[56] References Cited

U.S. PATENT DOCUMENTS

| | | | |
|---|---|---|---|
| 1,473,421 | 11/1923 | Eccleston | 494/29 |
| 1,594,501 | 8/1926 | Eccleston | 494/29 |
| 3,823,869 | 7/1974 | Loison . | |
| 4,286,748 | 9/1981 | Bailey . | |
| 4,608,040 | 8/1986 | Knelson . | |
| 4,776,833 | 10/1988 | Knelson | 494/27 |
| 4,824,431 | 4/1989 | McAlister . | |
| 4,846,781 | 7/1989 | Knelson . | |
| 4,983,156 | 1/1991 | Knelson | 494/28 |
| 5,338,284 | 8/1994 | Knelson . | |
| 5,368,541 | 11/1994 | Knelson | 494/29 X |
| 5,372,571 | 12/1994 | Knelson et al. | 494/29 |

FOREIGN PATENT DOCUMENTS

| | | | |
|---|---|---|---|
| 2205535 | 4/1936 | Australia | 494/27 |
| WO93/13864 | 7/1993 | WIPO . | |

*Primary Examiner*—Charles E. Cooley

*Attorney, Agent, or Firm*—Adrian D. Battison; Murray E. Thrift

[57] ABSTRACT

A centrifuge bowl includes a flat base and a generally conical peripheral wall upstanding from the base. A jacket surrounding the bowl allows injection of water from a chamber between the bowl and the jacket through openings in the peripheral wall into the bowl for fluidization of materials within the bowl. A feed duct extends to the base and discharges feed materials onto the base for moving outwardly onto the peripheral wall and passing over the peripheral wall. A first portion of the peripheral wall is smooth, imperforate and frusto-conical. At the upper edge of the first portion is provided a pair of axially spaced recesses with injection openings at the base of the recesses for the fluidizing water. Heavier materials collect within the recesses and are discharged outwardly through a plurality of controlled discharged openings around the recesses. Lighter materials escape through the open mouth of the bowl.

16 Claims, 1 Drawing Sheet

CENTRIFUGAL SEPARATOR WITH CONICAL BOWL SECTION AND AXIALLY SPACED RECESSES

BACKGROUND OF THE INVENTION

This invention relates to a centrifugal separator of the type which includes a centrifuge bowl mounted for rotation about an axis of the bowl, means for feeding a material to be separated to a base of the bowl and a peripheral wall of the bowl over which the materials flow, the peripheral wall being shaped to effect separation of heavier materials for collection from lighter materials which discharge over an open mouth of the bowl.

One example of a centrifugal separator of this general type is shown in U.S. Pat. No. 5,338,284 of the present inventor issued Aug. 16, 1994 which discloses a bowl having a plurality of recesses at axially spaced positions along the peripheral wall. Each recess has a plurality of holes through the peripheral wall for the injection of fluidizing water into the bowl to fluidize the materials within the recess. Each recess has in addition a plurality of discharge openings which allow the heavier collected materials in the recess to discharge radially outwardly through the peripheral wall for collection.

The bowl is generally of the type shown in U.S. Pat. No. 4,608,040 and in U.S. Pat. No. 4,846,781 of the present inventor.

Another example of centrifuge bowl of this type is shown in U.S. Pat. No. 3,823,869 of Loison which discloses a conical peripheral wall so that the feed material moves along the peripheral wall to a discharge slot which can be opened to release the heavier materials. A futher example of an arrangement of this type is shown in U.S. Pat. No. 4,824,431 of McAlister. A yet further example is shown in U.S. Pat. No. 1,882,389 of Mclsaac.

A further patent of McAlister which is WO 93/13864 shows the same construction as shown in his above earlier United States patent in which the collected material is discharged radially outwardly under control from a plurality of pinch valves.

The separation technique disclosed in the above patents of Knelson using the plurality of axially spaced recesses with the injection openings at the base of the recesses has been established as a particularly effective separation technique which allows a high throughput while maintaining losses at an acceptably low rate.

However one disadvantage of the technique using the plurality of axially spaced rings is that of a high requirement for water for injection into the bowl through the fluidizing openings. This requirement for a high quantity of water has the disadvantage that the water must be later separated from the slurry discharged from the mouth of the bowl and also limits or prevents the use of the technique where the required amount of water is not available.

SUMMARY OF THE INVENTION

It is one object of the present invention, therefore, to provide an improved centrifugal separator of the above general type which utilizes the fluidization technique disclosed by Knelson and yet reduces the required quantity of water for the fluidization.

According to one aspect of the invention there is provided a apparatus for separating intermixed materials of different specific gravity comprising a centrifuge bowl having a base end and a peripheral wall surrounding an axis passing through the base and generally upstanding from the base end to an open mouth, means mounting the bowl for rotation about the axis, feed means for feeding the intermixed materials into the bowl so that during rotation of the bowl the intermixed materials flow over the peripheral wall for discharge from the open mouth, first guide means for collecting the discharged materials, a plurality of inwardly projecting rings carried on the peripheral wall and extending therefrom generally towards the axis and defining therebetween at least one annular recess over which the materials pass so that heavier material collects in the recess between the inwardly projecting rings and lighter material passes thereover to the mouth for discharge therefrom, fluidizing means for fluidizing said heavier material in said at least one annular recess comprising a plurality of openings through the peripheral wall at said at least one recess and fluid injection means outside the peripheral wall for injecting fluid through the openings, and second guide means for collecting the heavier materials from said at least one recess, wherein said feed means comprises a duct extending into the bowl to a discharge mouth positioned adjacent said base end such that the feed materials are fed from the discharge mouth to move to the peripheral wall for said flowing movement over the peripheral wall, and wherein said peripheral wall of the bowl includes a first frusto-conical portion which increases in diameter from the discharge mouth to said at least one recess over which the feed materials pass and arranged such that said at least one recess is axially spaced from the discharge mouth by at least a part of an axial length of the first conical portion such that the feed materials pass over said at least a part of an axial length of the first conical portion before reaching said at least one recess.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
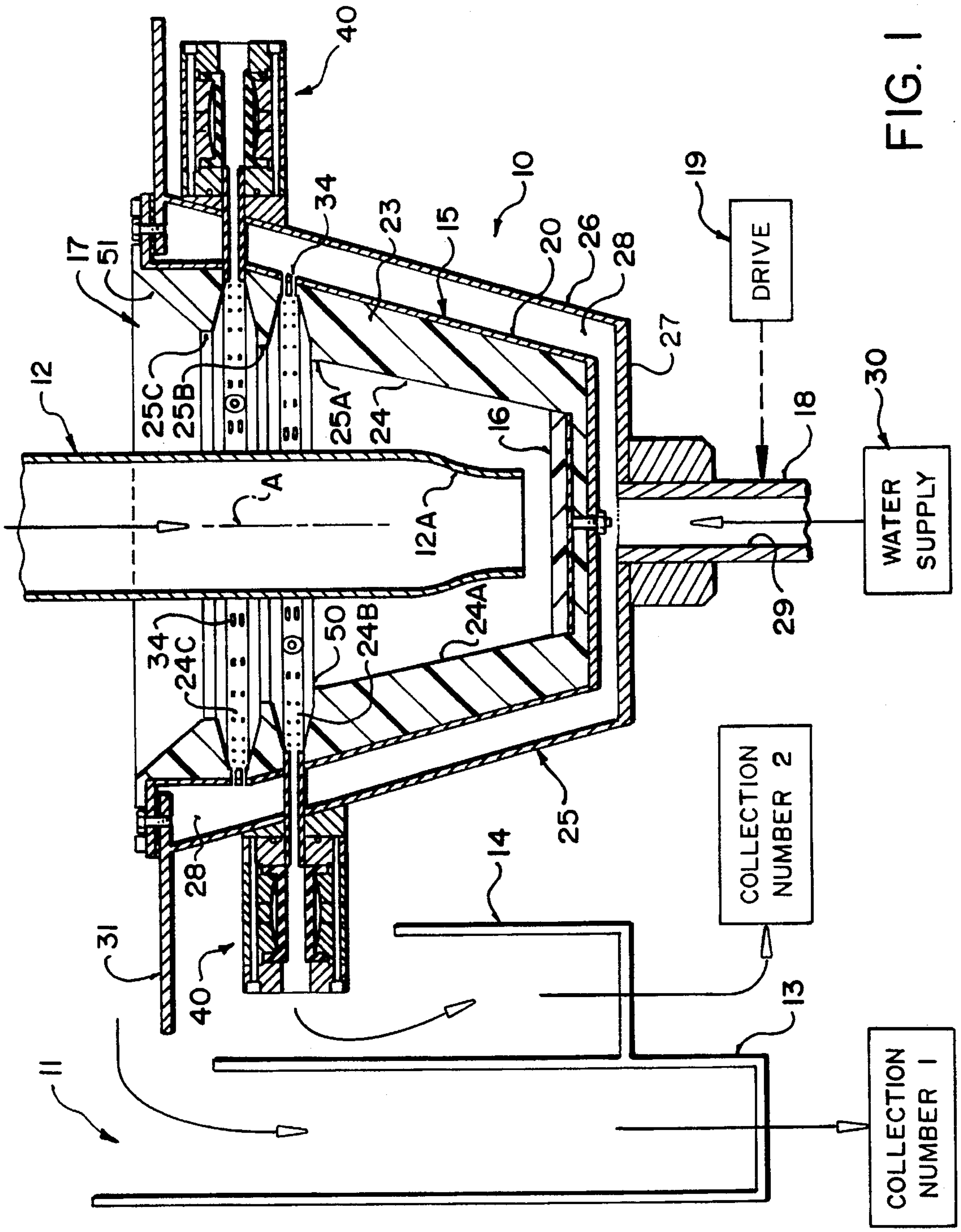
FIG. 1 is a cross sectional view through a centrifugal separator according to the present invention.

Reference is made to the above prior patents of Knelson and particularly U.S. Pat. No. 5,338,284 which discloses many details of the construction of the centrifugal separator which are not shown in the above figure for convenience of illustration. The details of the above patent are therefore incorporated herein by reference.

The apparatus therefore comprises a bowl generally indicated at 10 mounted in a housing 11. The housing includes a feed duct 12 through which an incoming feed material is supplied for separation into components of different density or weight. The housing further includes two outlets including a first discharge outlet 13 for lighter materials and a second discharge outlet 14 for heavier materials subsequent to the separation of the materials within the bowl The bowl. 10 includes a peripheral wall 15, a base 16 and an open mouth 17. The peripheral wall surrounds a vertical axis A of the bowl around which the bowl can be rotated by a shaft 18 on bearings (not shown) driven by a drive system schematically indicated at 19.

The base 16 is substantially flat and the peripheral wall 15 is frusto-conical so as to taper outwardly and upwardly from the base to the open mouth 17. The base and peripheral wall are formed of a suitable supporting metal layer 20 on which is cast an inner polyurethane liner 23 which is an outer surface bonded to the inner surface of the support wall 20 and an inner surface 24 over which the feed material from the feed duct 12 passes.

The base and the peripheral wall of the bowl are mounted within an outer jacket 25 including a peripheral wall 26 and a base 27 generally parallel to the base 16 of the bowl. Thus there is defined between the jacket and the inner bowl a substantially cylindrical open chamber 28 for receiving a pressurized fluid generally water. The water is supplied through a duct 29 passing through an opening in the shaft from a water supply generally indicated at 30.

The upper edge of the peripheral wall 26 is connected to the upper edge of the peripheral wall 15 by a flange arrangement 31 which seals the chamber 28 and includes an outwardly projecting flange portion 32 extending beyond the peripheral wall 26, The inner surface of the liner is molded to form a first frusto-conical portion 24A followed by two annular grooves or recesses 24B and 24C. The grooves or recesses 2413, 24C are shaped and arranged as shown and described in the above United States patent so that each includes a bottom side wall 25A, a top side wall 35B and an outer base between the side walls. Each recess includes a plurality of holes or openings 34 through the outer base which act as fluidizing openings for receiving the water from the jacket 28 for fluidizing the material within the recesses.

In addition each of the recesses includes a plurality of outlet elements 40 which are arranged at spaced positions around the groove.

The shape, arrangement and operation of the recesses, the openings 34 and the outer elements 40 are shown and described in the above United States patent and therefore will not be repeated herein.

The initial frusto-conical portion 24A of the bowl has a height greater than the height of the bowl from the bottom recess 24B to the open mouth 17. The frusto conical portion 24A is smooth so that it has no recesses and no projections. The frusto conical portion 24A is imperforate so that there is no injection water passing through the of the bowl from the jacket 28. The frusto conical portion 24A is of a constant cone angle so as to smoothly diverge outwardly from the base 16 to a lip 50 at an upper edge of the portion 24A. The lip 50 is arranged at the bottom side wall 35 of the recess 24B so that the side wall 35 extends generally outwardly of the axis from the lip 50.

The recess 24C is of a greater diameter at the base than the recess 24B with the inside edges of the ribs side walls 35 and 36 of the recesses 24B, 24C gradually increasing in diameter from the lip 50 to the inside edge of the upper side wall 36 of the recess 24C. From the apex of the upper side wall of the recess 24C, the wall defines a sharply diverging surface 51 which extends from, the apex to the open mouth 17.

In operation the feed materials are fed through the feed duct 12 which converges inwardly at a lower end as indicated at 12A so as to control the amount of feed material passing through the duct 12. The feed material escapes from the discharge mouth at the lower end of the duct 12 onto the base 16 where the feed material extends or passes outwardly to the peripheral wall and commences on the conical portion 24A on which it is moved outwardly and accelerates up to the speed of the bowl. This movement therefore generates a smooth layer on the inside surface of the bowl with that layer moving axially along the bowl and angularly around the bowl. The length of the frusto-conical portion 24A from the lower end receiving material from the mouth of the duct to the upper end at the lip 50 which is axially spaced from the discharge mouth is sufficient to allow the layer to become smooth and to reduce the turbulence in view of the acceleration of the layer toward the speed of the bowl. When the layer has smoothed or settled onto the portion 24A, the layer engages the recesses 24B and 24C which effect the separation of the materials. In addition the smooth movement of the materials over the portion 24A allows some stratification of the heavier materials to occur due to the centrifugal action as the material passes over the portion 24A. When the material thus encounters the first of the recesses 24B at the position axially spaced from the discharge mouth of the duct, the stratification allows the heavier materials to move outwardly more readily into the recess for collection.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An apparatus for separating intermixed materials of different specific gravity comprising:

a centrifuge bowl having a base and a peripheral wall surrounding an axis passing through the base and generally upstanding from the base to an open mouth;

means mounting the bowl for rotation about the axis;

feed means for feeding the intermixed materials into the bowl so that during rotation of the bowl the intermixed materials flow over the peripheral wall for discharge from the open mouth;

first guide means for collecting the materials discharged from the open mouth;

at least one annular recess on the peripheral wall over which the materials pass so that heavier material collects in the recess and lighter material passes over the recess to the open mouth for discharge from the open mouth;

said at least one recess being defined by a lower side wall and an upper side wall which extend generally outwardly of the axis to an outer base of said at least one recess;

fluidizing means for fluidizing said heavier material in said at least one annular recess comprising a plurality of openings through the peripheral wall at said at least one recess and fluid injection means outside the peripheral wall for injecting fluid through the openings;

and second guide means for collecting the heavier materials from said at least one recess;

wherein said feed means comprises a feed duct extending into the bowl to a discharge mouth positioned adjacent said base of the bowl such that the feed materials are fed from the discharge mouth to move to the peripheral wall for said flowing movement over the peripheral wall;

and wherein said peripheral wall of the bowl includes a frusto-conical portion which extends axially of the peripheral wall from a lower end on the peripheral wall arranged for receiving said feed materials from the discharge mouth to an upper end of the frusto-conical portion which is axially spaced from the discharge mouth;

said frusto-conical portion being substantially smooth and substantially imperforate and increasing in diameter from said lower end to said upper end;

said at least one recess being arranged such that the lower side wall thereof connects with the upper end of the frusto-conical portion and extends outwardly relative to the axis from the upper end of the frusto-conical portion;

said at least one recess thus being axially spaced from the discharge mouth by at least a part of an axial length of the frusto-conical portion such that the feed materials pass over said at least a part of the axial length of the frusto-conical portion before reaching said at least one recess.

2. The apparatus according to claim 1 wherein a lower end portion of the frusto-conical portion is axially aligned with the discharge mouth of the feed duct.

3. The apparatus according to claim 1 wherein the axial length of the frusto-conical portion is greater than an axial length of said at least one recess.

4. The apparatus according to claim 1 wherein the axial length of the frusto-conical portion is greater than an axial length of the peripheral wall from the frusto-conical portion to said mouth.

5. The apparatus according to claim 1 wherein said at least one recess comprises at least two recesses.

6. The apparatus according to claim 1 wherein said at least one recess has associated therewith a plurality of angularly spaced discharge openings each extending through the peripheral wall substantially radially outwardly therefrom, and wherein said discharge openings cooperate with said second guide means for substantially continuously collecting said heavier material.

7. The apparatus according to claim 6 wherein each discharge opening extends over only a small part of the angular extent of said at least one recess so as to leave a major part of the angular extent of said at least one recess free from said discharge openings.

8. The apparatus according to claim 6 wherein said openings through the peripheral wall are arranged to inject said fluid in a direction to cause said heavier material in said at least one recess to move circumferentially relative to the peripheral wall of the bowl to the discharge openings to escape from said at least one recess to said second guide means.

9. A method for separating intermixed materials of different specific gravity comprising:

providing a centrifuge bowl having a base and a peripheral wall surrounding an axis passing through the base and generally upstanding from the base to an open mouth;

rotating the bowl about the axis;

feeding the intermixed materials into the bowl so that during rotation of the bowl the intermixed materials flow over the peripheral wall for discharge from the open mouth;

collecting the materials discharged from the open mouth;

providing at least one annular recess on the peripheral wall over which the materials pass so that heavier material collects in the recess and lighter material passes over the recess to the open mouth for discharge from the open mouth;

said at least one recess being defined by a lower side wall and an upper side wall which extend generally outwardly of the axis to an outer base of said at least one recess;

fluidizing said heavier material in said at least one annular recess by providing a plurality of openings through the peripheral wall at said at least one recess and injecting fluid through the openings;

collecting the heavier materials from said at least one recess;

feeding said intermixed materials through a feed duct extending into the bowl to a discharge mouth positioned adjacent said base of the bowl such That said intermixed materials are fed from the discharge mouth to move to the peripheral wall for said flowing movement over the peripheral wall;

providing on said peripheral wall of the bowl a frusto-conical portion which extends axially of the peripheral wall from a lower end on the peripheral wall receiving said intermixed materials from the discharge mouth to an upper end of the frusto-conical portion which is axially spaced from the discharge mouth;

said frusto-conical portion being smooth and imperforate and increasing in diameter from said lower end to said upper end;

said at least one recess being arranged such that the lower side wall thereof connects with the upper end of the frusto-conical portion and extends outwardly relative to the axis from the upper end of the frusto-conical portion;

said at least one recess thus being axially spaced from the discharge mouth by at least a part of an axial length of the frusto-conical portion with the part being sufficiently long such that the feed materials, passing over said at least a part of the axial length of the frusto-conical portion form a smoothed layer moving along said peripheral wall before reaching said at least one recess with said smoothed layer travelling in a direction to pass across said recess.

10. The method according to claim 9 including aligning a lower end portion of the frusto-conical portion axially with the discharge mouth of the feed duct.

11. The method according to claim 9 including arranging the axial length of the frusto-conical portion so as to be greater than an axial length of said at least one recess.

12. The method according to claim 9 including arranging the axial length of the frusto-conical portion so as to be greater than an axial length of the peripheral wall from the frusto-conical portion to said mouth.

13. The method according to claim 9 including providing as said at least one recess at least two recesses.

14. The method according to claim 9 including providing in said at least one recess a plurality of angularly spaced discharge openings each extending through the peripheral wall substantially radially outwardly therefrom, and arranging said discharge openings to cooperate with said second guide means for substantially continuously collecting said heavier material.

15. The method according to claim 14 including arranging each discharge opening so as to extend over only a small part of the angular extent of said at least one recess so as to leave a major part of the angular extent of said at least one recess free from said discharge openings.

16. The method according to claim 14 including arranging said openings through the peripheral wall to inject said fluid in a direction to cause said heavier material in said at least one recess to move circumferentially relative to the peripheral wall of the bowl to the discharge openings to escape from said at least one recess to said second guide means.

* * * * *